Patented June 24, 1930

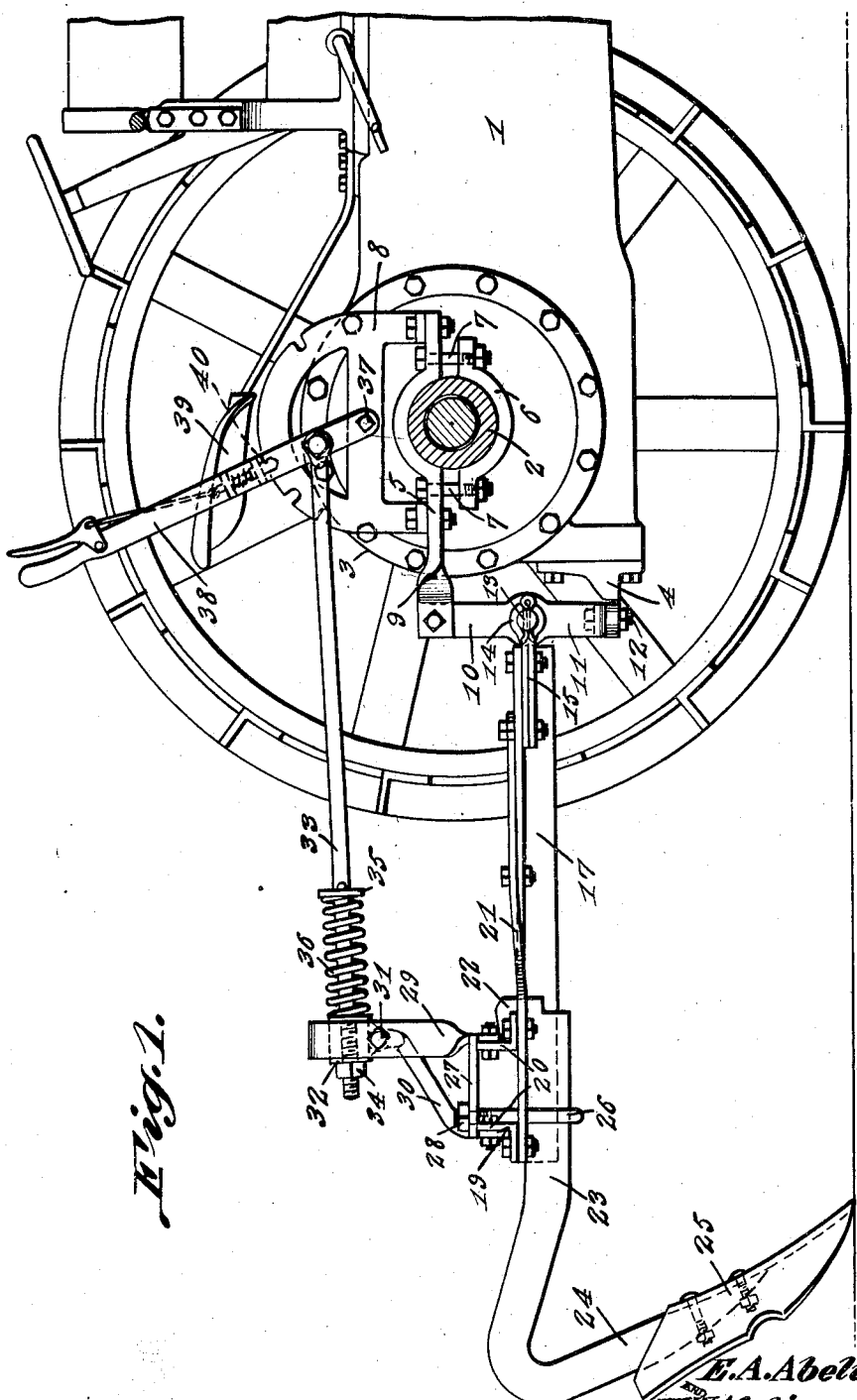

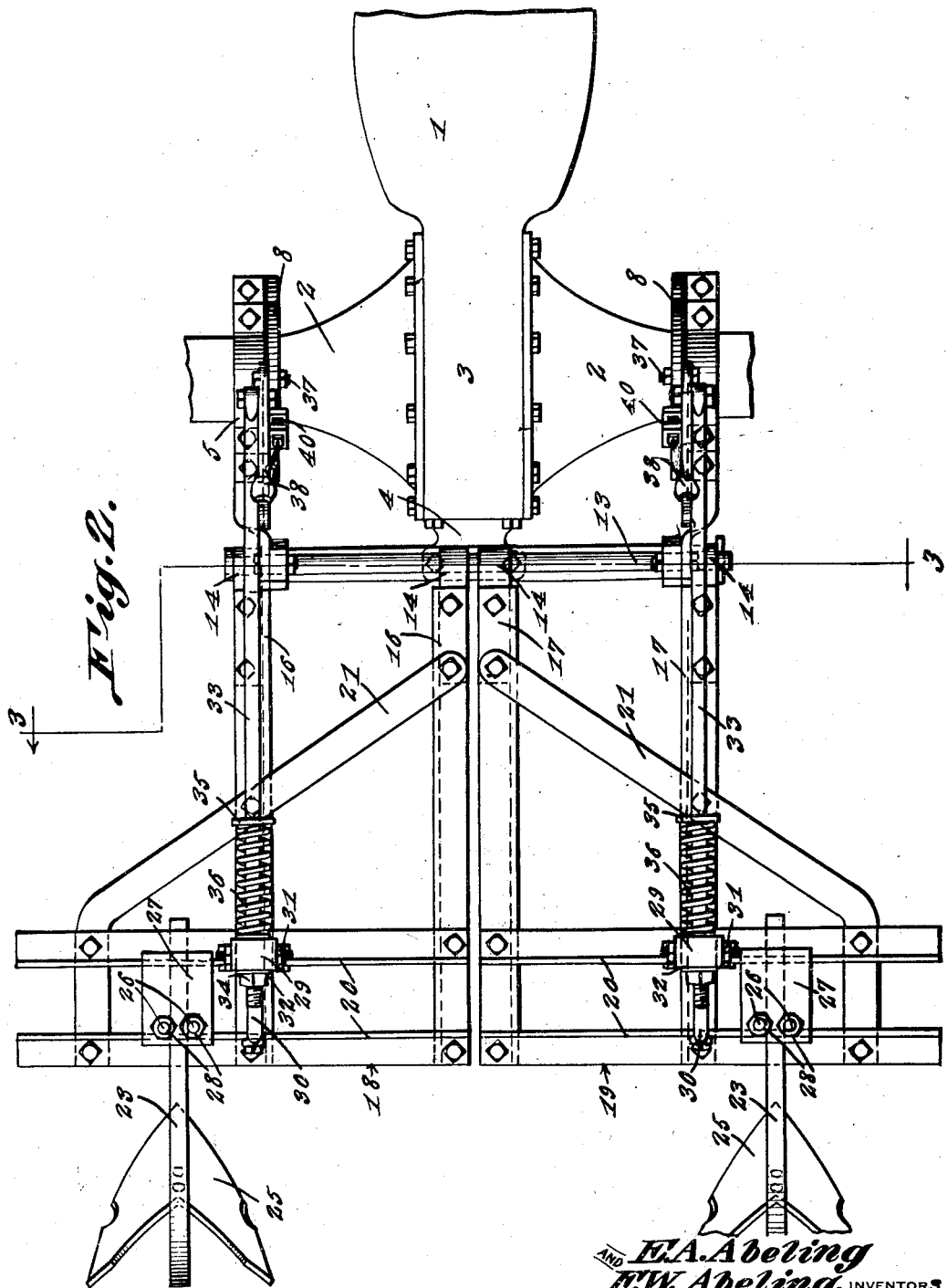

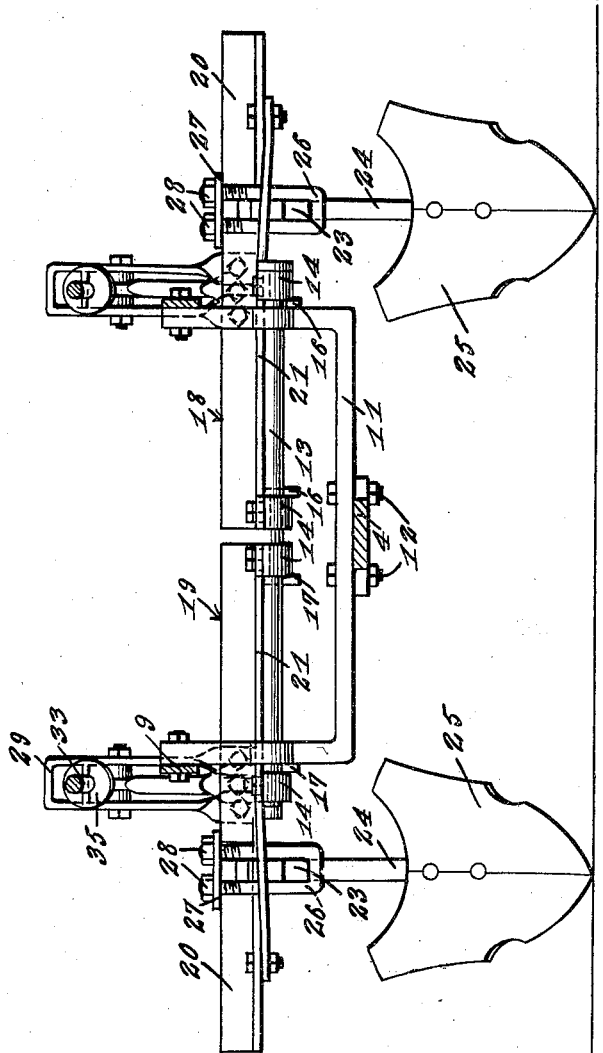

1,768,019

UNITED STATES PATENT OFFICE

EDWARD A. ABELING AND FRED W. ABELING, OF CASHMERE, WASHINGTON

DITCHER FOR TRACTORS

Application filed June 10, 1929. Serial No. 369,741.

Our present invention has reference to a ditching attachment for tractors.

Our primary object is the provision of a device for this purpose which may be easily, quickly and securely attached to the rear axle housing of a tractor, and in which either of the ditching plows may be vertically adjusted and sustained without necessitating the driver of the tractor leaving his seat.

A further object is in the provision of an attachment for this purpose in which the ditching plows are rigidly supported upon vertically adjustable frames, the adjustment of the said frames being regulated by lever operated means at the opposite sides of the seat of the driver of the tractor and wherein the plows are so mounted as to permit of the lateral adjustment thereof with respect to each other, with the result that ditches of varying widths may be successfully made by the plows and likewise with the result that ditches of different depths may be made by the plows.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 1 is a side elevation of my improvement, one of the wheels of the tractor being removed and the rear axle and axle housing therefor being in section.

Figure 2 is a plan view thereof.

Figure 3 is a transverse sectional view approximately on the line 3—3 of Figure 2.

In the drawings, the numeral 1 designates the rear portion of a tractor, sufficient to illustrate the application of our improvement thereon. The rear axle housing for the tractor is indicated by the numeral 2, the differential housing to which the axle housing sections 2 are attached by the numeral 3 and the draw bar cap or bracket, which is attached to the rear of the housing 3 by the numeral 4.

Secured on both of the sections of the rear axle housing 2 there are clamps. Each clamp comprises a pair of separable members, the upper members for distinction being indicated by the numeral 5 and the lower members by the numeral 6. Each of the members 5 and 6 has a rounded or arched portion for snug engagement with the cross sectionally rounded housing sections 2, there being bolts 7 engaged by suitable nuts passing through the straight arms of both of the sections for binding the said sections on the housing. The upper elements of the clamps, at the opposite sides of the said rounded portions have bolted or otherwise secured thereon upwardly directed arched racks 8; and the rear portions of the straight arms of the said members 5 extend a suitable distance beyond the housing sections 2 and are given a half twist, as at 9, and to these vertically disposed ends 9 there are bolted or otherwise secured the ends of the upstanding arms 10 of a substantially U-shaped member 11. The flat connecting element for the arms 10 of the U-shaped member rests and is secured to the draw bar cap by removable elements, such as bolts 12, which are engaged by nuts.

The parallel or vertical arms 10 of the U-shaped member 11 are approximately centrally formed with round openings which aline and which openings may be surrounded by bosses. Finding bearings in these openings there is a shaft 13, suitable means being provided for holding the shaft from longitudinal movement. Arranged on the shaft 13, adjacent to the outer ends thereof, and likewise adjacent to the center thereof there are bearings 14 formed on the ends of brackets 15. To these brackets there are bolted or otherwise fixedly secured the parallel pairs of beams 16—16 and 17—17 for the supporting frames 18 and 19 of the ditching shovels. Obviously, the beams 16—16 and 17—17 may have their inner ends rounded to provide bearings through which the shaft 13 passes. The frames 18 and 19 each comprise a pair of spaced angle plates, the inner and confronting flanges 20 of which being inwardly and upwardly directed. Bolted or otherwise secured to the beams 16—16 and 17—17 for the frames 18 and 19 there are angle brace members 21 which have straight ends that are arranged between the angle plates constituting the frame members 18 and 19 and bolted thereto.

The edges of the inner members constituting the angle plates of the frames 18 and 19 are designed to be engaged by the hooked ends 22 on the comparatively short beams 23 that are formed with downwardly extending standards 24 to which are secured the ditching plows 25. The beam 23 for each of the standards 24 has arranged therearound a U-bolt 26 which is designed for contacting engagement with the inner flanges 20 of the outer members of the frames 18 and 19, and these bolts pass through openings in plates 27 that rest on the upper edges of the frame members 18 and 19, the said U-bolts being engaged by nuts 28 which, of course, bind against the plates 27. By constructing the frame and ditching plow beams as just described, it will be noted that the said frames are hingedly mounted upon the shaft 13 and likewise that it is merely necessary to loosen the nuts 28 to adjust the ditching plows on the frames, to bring the said plows toward or away from each other so that ditches may be made by the plows in desired spaced relation to each other.

Fixedly secured, preferably by bolts on the upstanding flanges of the inner members of the frames 18 and 19, and disposed directly over the outer beams 16 and 17 there are upstanding brackets 29. An angle brace 30 is connected to each of the brackets 29 and likewise connected to the upstanding flange 20 of each of the outer members of the frames 18 and 19. These brackets 29 are of substantially U-shaped formation as clearly disclosed by Figure 3 of the drawings, and pivotally secured between the parallel arms of each of the said brackets 29, by removable means 31, there is a socket member 32. Passing through each of the sockets 32 there is a rod 33. The outer end of each of the rods is threaded and has screwed thereon a nut member 34 which contacts with the outer face of the socket members 32. Also fixed on each of the rods 33 there is a stop element 35 on one end of a convolute spring 36 that is arranged around each of the said rods 33 and exerts a pressure against the socket member 32.

Pivotally secured, preferably by removable means 37, to the outer face of each of the toothed segments 8 there is a lever 38. By reference to the drawings it will be seen that these levers are disposed adjacent to and in close proximity to the seat 39 for the driver of the tractor. Each lever has guided thereon a handle operated spring influenced dog 40 to engage in the notches of the segmental racks 8. By this arrangement it will be apparent that the operator without leaving the seat 39 may swing either of the ditching plow carrying frames to force the same into the earth or in a reverse direction so that ditches of different depths may be made by the said plows 25. Obviously the levers are independently operated.

While we have described our improvement in connection with ditching plows for tractors it is obvious that other appliances for agricultural purposes may be attached to the frames 18 and 19 and may be laterally adjusted thereon.

Having described the invention, we claim:

A tractor attachment, comprising sectional clamps which are bolted on the rear axle housing of a tractor and the upper elements of the clamps carrying segmental racks, a U-shaped member having its parallel arms bolted to the clamps, resting on the draw bar cap of the tractor and removably bolted thereto, a shaft journaled transversely through the arms of the U-shaped member, pairs of spaced beams having their inner ends journaled on the shaft, transversely arranged angle plates having their inner flanges upwardly directed secured to the beams and providing frames, brace means between the beams and the outer ends of the frame, plow carrying standards provided with short beams that have hooked ends to engage with the inner members of the frames, U-shaped bolts surrounding the beams and contacting with the outer members of the frames, and passing through plates which rest on the frames, nuts engaging said bolts, upstanding U-shaped brackets on the inner members of the frames, brace means between the brackets and the outer members of the frame, a socket pivotally secured in each bracket, a threaded rod passing through each socket member, a nut screwed on each rod and contacting with the outer face of the socket member, a stop element on each rod, a spring surrounding each rod and exerting a pressure between the stop element and the socket, a lever pivotally secured to each of the racks and to which the mentioned rods are pivoted, and hand operated spring influenced dogs carried by each lever for engaging with the racks.

In testimony whereof we affix our signatures.

EDWARD A. ABELING.
FRED W. ABELING.